United States Patent
Johansson et al.

(10) Patent No.: US 8,228,367 B2
(45) Date of Patent: Jul. 24, 2012

(54) THREE-DIMENSIONAL RECONSTRUCTION OF SCENES AND OBJECTS

(75) Inventors: Björn Johansson, Lund (SE); Beatriz Grafulla-Gonzalez, Lund (SE); Per Persson, Södra Sandby (SE); Sanbao Xu, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 776 days.

(21) Appl. No.: 12/420,943

(22) Filed: Apr. 9, 2009

(65) Prior Publication Data

US 2010/0259594 A1    Oct. 14, 2010

(51) Int. Cl.
*H04N 13/00* (2006.01)
(52) U.S. Cl. ............ 348/43; 348/E5.022; 348/E13.001; 345/473
(58) Field of Classification Search ............ 348/E5.022, 348/E13.001, 43; 345/473
See application file for complete search history.

(56) References Cited

U.S. PATENT DOCUMENTS

| | | | |
|---|---|---|---|
| 5,005,147 A | 4/1991 | Krishen et al. | |
| 6,995,762 B1 | 2/2006 | Pavlidis et al. | |
| 2005/0135670 A1 | 6/2005 | Vaidyanathan | |
| 2006/0028552 A1 | 2/2006 | Aggarwal et al. | |
| 2006/0221072 A1 | 10/2006 | Se et al. | |

FOREIGN PATENT DOCUMENTS

| | | |
|---|---|---|
| FR | 2910648 A1 | 6/2008 |
| WO | 2008/145952 A1 | 12/2008 |

OTHER PUBLICATIONS

Bok, Y. et al. "Accurate Motion Estimation and High-Precision 3D Reconstruction by Sensor Fusion." 2007 IEEE International Conference on Robotics and Automation, Roma, Italy, Apr. 10-14, 2007.
Chen, J. et al. "Structure and Motion by Fusion of Inertial and Vision-Based Tracking." Proceedings of the 28th OAGM/AAPR Conference, vol. 179 of Schriftenreihe, pp. 55-62, OCG, 2004.

*Primary Examiner* — Khanh Dinh
(74) *Attorney, Agent, or Firm* — Coats & Bennett, PLLC (57) ABSTRACT

A radio transceiver included in or attached to an imaging camera is used to facilitate the automatic determination of a scale factor in a three-dimensional (3D) reconstruction. The radio transceiver transmits a radio signal from each of one or more camera positions and measures a reflection profile for the transmitted signal. The measured reflection profile is compared to a simulated reflection profile, generated from a 3D model of the subject/scene of interest, to determine an estimate of an unknown scale for the 3D model. In various embodiments, the radio transceiver may be adapted from a radio device that already exists in or on the imaging camera (e.g., a cellular radio, Bluetooth® radio, or the like) or may be added to an imaging camera.

27 Claims, 6 Drawing Sheets

THREE-DIMENSIONAL RECONSTRUCTION OF SCENES AND OBJECTS

TECHNICAL FIELD

The present invention relates generally to digital reconstruction of three-dimensional objects or scenes from two-dimensional images, and is more particularly related to determining scale information for such a three-dimensional reconstruction.

BACKGROUND

Three-dimensional (3D) reconstruction of objects or scenes from two-dimensional camera images is a well studied research area. In a typical approach, a number of corresponding features (e.g., points) in the scene are identified in each of several images, which in the most general case may have been captured by one or several cameras from camera positions and orientations that are not precisely known a priori. These correspondences between images give constraints on the relative position of the cameras; with enough correspondences, relative camera positions may be determined for the images. Once the relative camera positions are determined, the features can be determined in 3D space by triangulation.

A commonly used mathematical model for the camera is the perspective camera model. According to this model, the projection of a point in 3D space with coordinates X to an image point with coordinates x can be described with the camera equation:

$$\lambda \begin{pmatrix} x \\ 1 \end{pmatrix} = KR(I \mid -t) \begin{pmatrix} X \\ 1 \end{pmatrix}, \quad (1)$$

where K is a upper right triangular matrix containing the intrinsic camera parameters, R is an orthogonal matrix describing the orientation of the camera, t is the position of the camera and $\lambda$ is a constant. Given a number of corresponding image points ($x_{ij}$) in several images, the unknowns $K_j$, $R_j$, $t_j$ and $X_i$ can be estimated by solving a big system of equations. Here i is an index for the points in 3D space and j is an index for the images.

Those skilled in the art will appreciate that using the perspective camera model discussed above, a reconstruction can be determined only up to an unknown projective transformation, absent detailed knowledge of the camera parameters and camera positions or motion. This is because the camera matrix $KR(I|-t)T^{-1}$ and point TX will give the same image points as the camera matrix $KR(I|-t)$ and point x for an arbitrary invertable matrix T, so there is no way of determining which one of these reconstructions is the correct one without further information about the camera positions or intrinsic camera parameters. If certain knowledge of the intrinsic camera parameters is available (e.g. their values or that they are constant) the reconstruction may be determined up to an unknown scale, rotation, and translation. That the scale cannot be determined can be seen by observing that the camera matrix $KR(I|-st)$ and point $$\begin{pmatrix} sX \\ 1 \end{pmatrix}$$

will give the same image point as the camera matrix $KR(I|-t)$ and 3D point $$\begin{pmatrix} X \\ 1 \end{pmatrix}$$

for an arbitrary scale s. The unknown rotation and translation stems from the choice of coordinate system in the reconstruction.

If the scale factor for a 3D reconstruction is unknown, it is impossible to make metric measurements in the 3D reconstruction, to add external 3D objects into the reconstruction (since the relative scale is unknown), to combine different 3D reconstructions into a single scene, or to generate pair of stereo images with a particular distance between the corresponding cameras. This problem is solved today in various ways. One way is to include a reference object, such as a ruler or other device of known dimensions, in the scene. Since the dimensions of the reference object are known, the scale of the 3D reconstruction can be determined. Alternatively, if multiple cameras are used and the distance between them is known, then the scale factor can also be determined. Or, if a single camera is mounted on a robot that can estimate the camera motion between image captures, the scale factor can again be determined based on the known relative position between image captures. Yet another way to deal with the problem of combining 3D models, without actually solving the scaling problem, is to manually scale the 3D reconstruction until it looks acceptable to a human operator in relation to an external object or another 3D reconstruction. If metric measurements on the external object are known, then a low-precision estimate of the scale of the 3D reconstruction can be determined. Of course, each of these approaches has serious limitations, as it may be impossible to insert a reference object or to track the relative positions of the imaging cameras, in some circumstances. Furthermore, manual processing may be undesirable or too inaccurate.

SUMMARY

In several embodiments of the present invention, an active device included in or attached to the imaging camera is used to facilitate the automatic determination of a scale factor in a three-dimensional (3D) reconstruction. In particular, the active device in some embodiments is a radio transceiver that transmits a radio signal from each of one or more camera positions and measures a reflection profile for the transmitted signal. This reflection profile is compared to a simulated reflection profile that is generated from a 3D model of the subject/scene of interest to determine an estimate of the unknown scale for the 3D model. In various embodiments, the radio transceiver may be adapted from a radio device that already exists in or on the imaging camera (e.g., a cellular radio, Bluetooth® radio, or the like) or may be added to an imaging camera.

Thus, an exemplary image processing apparatus, according to some embodiments of the invention, includes a digital camera device, a radio transceiver, and processing circuitry configured to determine an estimate of an unknown scale for a 3D model by constructing the 3D model of a subject of interest based on image data of the subject of interest captured from each of a plurality of camera positions, measuring a reflection profile for a radio signal transmitted by the radio transceiver from a first one of the camera positions, generating a simulated reflection profile corresponding to the first one of the camera position, and calculating an estimate of the unknown scale for the three-dimensional model by comparing the measured reflection profile to the simulated reflection profile. In some embodiments, as suggested above, the radio transceiver may be one of a cellular communications transceiver, a wireless local-area network transceiver, and a short-range wireless transceiver.

In some embodiments, the processing circuitry is configured to control the radio transceiver to transmit the radio signal simultaneously with the capturing of the image data for the first one of the camera positions. In some of these and other embodiments, the processing circuitry is configured to measure the reflection profile for the transmitted radio signal by generating a graph of correlations between the transmitted radio signal and a received reflected radio signal at a plurality of time delays. In particular, the simulated reflection profile is generated in some of these embodiments by calculating round-trip delays corresponding to a plurality of expected reflection paths, based on the three-dimensional model of the subject of interest and a reference scaling metric, and generating a simulated graph of correlations based on the calculated round-trip delays. In some of these embodiments, generating the simulated reflection profile further comprises estimating reflection magnitudes corresponding to one or more of the expected reflection paths, based on the three-dimensional model of the subject of interest and the reference scaling metric, and generating the simulated graph of correlations based further on the estimated reflection magnitudes.

In some embodiments, the processing circuitry is configured to calculate the estimate of the unknown scale for the three-dimensional model by determining which of a plurality of trial scaling factors, when applied to the simulated reflection profile to obtain a scaled simulated reflection profile, yields the highest correlation between the scaled simulated reflection profile and the measured reflection profile. In these and other embodiments, additional reflection profiles, corresponding to images taken from additional camera positions, may be used to improve the estimation of the unknown scale for the 3D model. Thus, the processing circuitry in some of these embodiments is configured to measure one or more additional measured reflection profiles corresponding to one or more additional camera positions, to generate one or more additional simulated reflection profiles corresponding to the one or more additional camera positions, to calculate an additional scale estimate for each of the one or more additional camera positions by comparing the additional measured reflection profiles to the corresponding additional simulated reflection profiles, and to compute an average scale estimate from the first estimate of the unknown scale and the additional scale estimates.

Other embodiments of the present invention may include image processing apparatus that is physically separate from the camera device and the radio transceiver discussed above. These embodiments are configured to receive image data and reflection profile data from the device or devices capturing digital images of the subject of interest, and to process the received data to produce a 3D model and a scale factor for the 3D model. An exemplary embodiment of such an apparatus includes a communications interface configured for communicating with an image capture apparatus and a processing subsystem, wherein the processing system is configured to receive, via the communications interface, image data of a subject of interest captured by the image capture apparatus from each of a plurality of camera positions, to construct a three-dimensional model of the subject of interest based on the captured image data, to receive, via the communications interface, reflection profile data corresponding to a reflection profile measured by the image capture apparatus by transmitting a radio signal from a first one of the camera positions and measuring a reflected return signal, to generate a simulated reflection profile corresponding to the first one of the camera positions, and to calculate a first estimate of the unknown scale for the three-dimensional model by comparing the reflection profile data to the simulated reflection profile.

As with the apparatus discussed earlier, some of these embodiments may be configured to generate the simulated reflection profile by calculating round-trip delays corresponding to a plurality of expected reflection paths, based on the three-dimensional model of the subject of interest and a reference scaling metric, and generating a simulated graph of correlations based on the calculated round-trip delays. In some cases the simulated reflection profile is further generated by estimating reflection magnitudes corresponding to one or more of the expected reflection paths, based on the three-dimensional model of the subject of interest and the reference scaling metric, and generating the simulated graph of correlations based further on the estimated reflection magnitudes.

Of course, those skilled in the art will appreciate that the present invention is not limited to the above examples, nor to the specific features, advantages, and contexts discussed above. In particular, those skilled in the art will note that embodiments of the invention include various methods detailed below, some of which correspond closely to the apparatus discussed above, and will recognize additional features and advantages of the inventive techniques disclosed herein upon reading the following detailed description and upon viewing the accompanying drawings.

BRIEF DESCRIPTION OF THE DRAWINGS

FIG. 7A illustrates the transmission and reflection of radio waves in a simplified scenario, while

DETAILED DESCRIPTION

The use of the term "exemplary" is used herein to mean "illustrative," or "serving as an example," and, unless the context clearly indicates otherwise, is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement, again unless the context clearly indicates otherwise.

As discussed above, a 3D reconstruction of a subject of interest can be formed by combining images of the subject taken from a plurality of camera positions. A great deal of research has been conducted into 3D reconstruction techniques; some of this research has additionally focused on the fusing of other sensor data with the image data to improve the quality of the 3D reconstruction. Examples of articles reporting such research include Yunsu Bok et al., "Accurate Motion Estimation and High-Precision 3D Reconstruction by Sensor Fusion," in 2007 IEEE International Conference on Robotics and Automation, Roma, Italy, 10-14 Apr. 2007, pp. 4721-26; Jing Chen et al., "Structure and Motion by Fusion of Intertial and Vision-Based Tracking," in W Burger and J. Scharinger, eds., Digital Imaging in Media and Education, Proceedings of the 28$^{th}$ OAGM/AAPR Conference, vol. 179 of Schriftenreihe, 2004, pp. 55-62. Patent documents based on such research include U.S. Patent Application Publication No. 2006/0221072 A1 by Se et al.; U.S. Pat. No. 6,995,762 B1, to Pavlidis et. al.; and U.S. Patent Application Publication No. 2006/0028552 A1, by Aggarwal et al.; the entire contents of each of these patent application documents are incorporated by reference herein to provide background and context for the inventive techniques described below.

As noted above, absent detailed knowledge of the camera parameters and camera positions or motion, a 3D reconstruction assembled from digital images taken from a plurality of camera positions can be determined only up to an unknown projective transformation. If the camera parameters are available, but the absolute or relative camera positions corresponding to the digital images are unknown, then the reconstruction may be determined up to an unknown scale, rotation, and translation. As further discussed above, the lack of a known scale can make some further uses of the 3D reconstruction difficult or impossible. For example, the lack of a known scale factor for the 3D reconstruction can make it impossible to make accurate measurements of objects in the 3D reconstruction, to add 3D objects into the reconstruction, or to combine different 3D reconstructions into a single scene.

One way to determine the scale of a 3D reconstruction is to directly measure the distance from the camera to one or more objects in the 3D scene, using, for example, a laser, auto-focus device, or the like, installed on the camera. Another approach, described in more detail below, is to use a radio transceiver, i.e., a sender and receiver of radio waves, to produce a reflection profile that may be used to estimate the scale of the 3D reconstruction. One advantage to this approach, in some embodiments of the present invention, is that one or more radio transceivers already exist on many camera devices, such as camera-equipped mobile phones, or wireless-enabled cameras. These transceivers may be adapted, as shown below, to measure reflection profiles for a photographic subject of interest, for use in determining a scale factor for a 3D reconstruction of the subject.

Generally speaking, several active devices may be used in various ways to obtain scaling information for a 3D reconstruction. Some of these devices may be used to measure or estimate the distance between the camera and a particular object in front of the camera. For instance, a laser-based range measurement system may be used to directly measure the distance to an imaged object. Alternatively, an infrared auto-focus device may be used to estimate the range from the camera to the image subject. In both cases, since the position and orientation of the camera is known relative to the reconstruction of the scene (albeit at an unknown scale and, in some cases, without any mooring to a fixed coordinate system) the measured distance can be identified in the reconstruction and the unknown scale can be determined. Indeed, a scale parameter can be estimated from every camera position, although the resulting scale parameter should be the same for all camera positions.

Another approach uses an accelerometer coupled to the camera to indirectly determine the camera's relative position at each of the camera positions from which an image is captured. The accelerometer is used to measure the acceleration and retardation in camera motion as the camera is moved from one position to another. The distance of the motion can be estimated by integrating the velocity created from the accelerometer data. If the positions from which images were captured are tracked, then the changes between these positions can be readily determined from the velocity data.

As noted above, yet another approach to determining the unknown scale of a 3D reconstruction is based on the use of a radio transmitter as an indirect ranging device. With this approach, reflections of radio waves responsive to a transmitted radio signal may be used to determine the distance to all reflecting objects in the scene. Unlike a laser range finder, however, this approach exploits the 3D knowledge already implicit in the 3D reconstruction.

Figure 1:
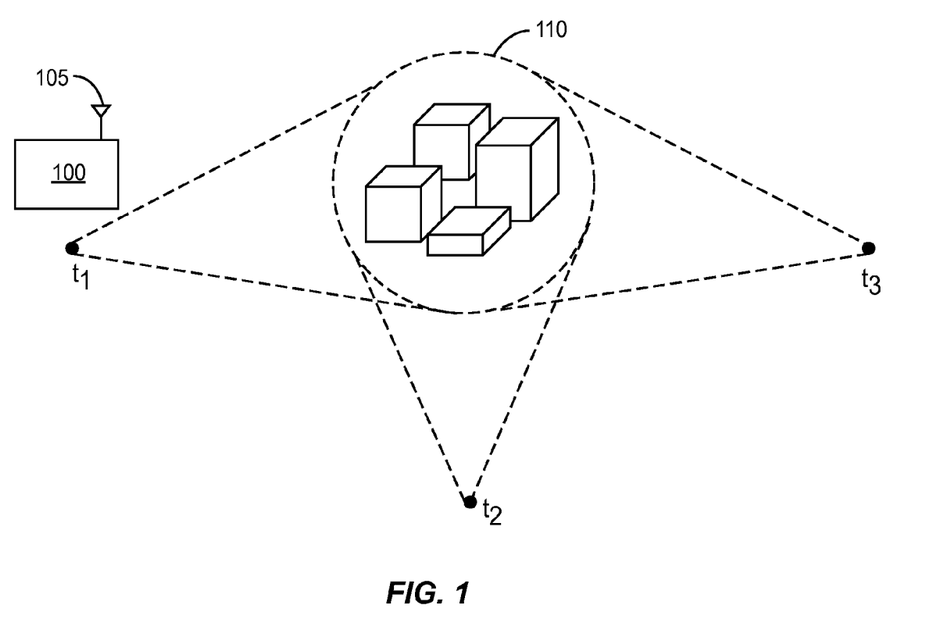
FIG. 1 is a schematic diagram illustrating an image processing apparatus, comprising a digital camera and a radio transceiver, as well as a photographic subject of interest.

FIG. 1 provides some context for the discussion that follows, illustrating a three-dimensional subject of interest 110 and an image processing apparatus 100. Image processing apparatus 100 is used to capture and save multiple digital images of the subject of interest 110, including from the positions t1, t2, and t3. These digital images may be processed according to known techniques to generate a 3D reconstruction of the subject of interest 110. Various techniques for 3D reconstruction from two-dimensional images are well known to those skilled in the art; since the details of those techniques are not important to a full understanding of the present invention, those details are not presented herein.

Furthermore, as will be discussed in more detail below, image processing apparatus 100 transmits a radio signal, via antenna 105, and measures a reflection profile that characterizes the reflection of the transmitted signal from the various features of the subject of interest 110. The information contained in this measured reflection profile is compared to the 3D knowledge of the subject of interest 110 implicit in the 3D reconstruction to determine a scale factor for the 3D reconstruction.

Figure 2:
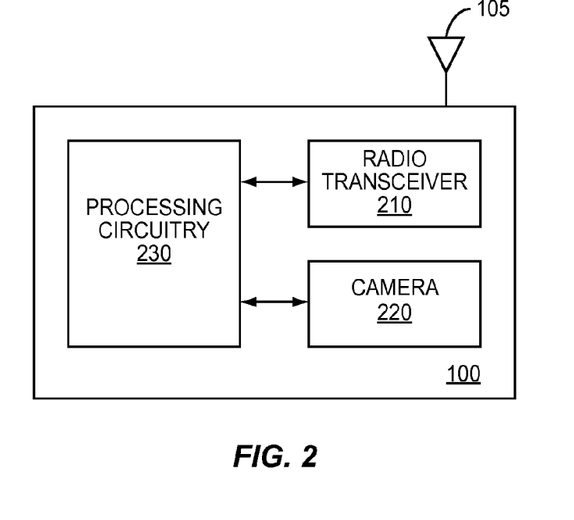
FIG. 2 is a block diagram of an image capture and processing apparatus according to some embodiments of the invention.

As shown in FIG. 2, image processing apparatus 100 thus includes a radio transceiver 210, a camera 220, and processing circuitry 230. As noted earlier, radio transceiver 210 may comprise or share circuitry with a cellular transceiver, such as a cellular transceiver generally compliant with one or more of the so-called "3G" telecommunications standards promulgated by the 3$^{rd}$ Generation Partnership Project (3GPP). Alternatively, radio transceiver 210 may comprise or share circuitry with a conventional wireless local area network (WLAN) transceiver, such as a transceiver generally compliant with one or more of the WLAN standards promulgated by the Institute of Electrical and Electronics Engineers (IEEE), e.g., the 802.11x family of standards. In still other embodiments, radio transceiver 210 may comprise or share circuitry with a standards-compliant short-range wireless transceiver, such as a Bluetooth® device; in yet other embodiments the radio transceiver 210 may be specifically designed for the purpose of generating radio signals and measuring a reflection profile from the reflected signal.

Thus, in some embodiments, radio transceiver 210 comprises a transmitter circuit configured to emit a radio signal, and a corresponding receiver circuit configured to receive reflections of the transmitted radio signal and to measure the amplitudes of those reflections. Those skilled in the art will appreciate that the transmitted signal may take any of a variety of forms, from one embodiment to another. For instance, some embodiments may be configured to transmit a very short pulse or train of pulses, with the receiver measuring the amplitude of received reflection energy as a function of time. Other embodiments may transmit a modulated waveform, in which case the receiver may be configured to cancel the transmitted signal from the received reflection signal, and to generate a graph of correlations between the transmitted receive signal and the received reflected radio signal at a plurality of time delays. Of course, those skilled in the art will recognize that many variations on these techniques are possible, and will further recognize that the particular technique or techniques chosen for a given embodiment will depend on such factors as the type of radio transceiver being adapted, the anticipated range and resolution requirements for the measurements, cost, etc.

Similarly, camera 220 may comprise any of a variety of digital camera devices, including but not limited to camera devices based on charge-coupled device (CCD) sensors or complementary metal-oxide semiconductor (CMOS) sensors. In some embodiments camera 220 includes a compression processor closely integrated with the image sensor, to provide image data compressed according to, e.g., JPEG standards. In other embodiments, image compression is handled by processing circuitry separate from the imaging device itself, such as in processing circuitry 230. Again, details of various digital camera devices and image compression techniques and hardware are well known to those skilled in the art and are thus not discussed further herein.

Figure 3:
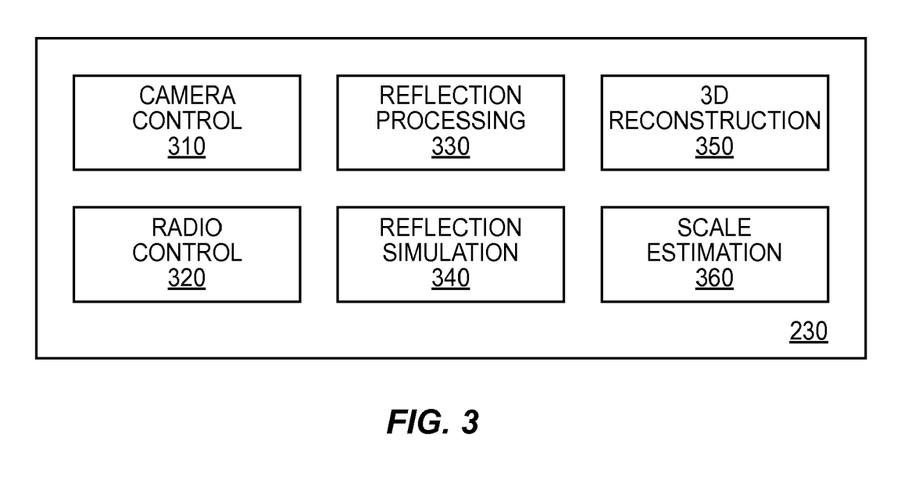
FIG. 3 is a functional block diagram illustrating exemplary functional elements of image processing circuitry according to some embodiments.
Figure 4:
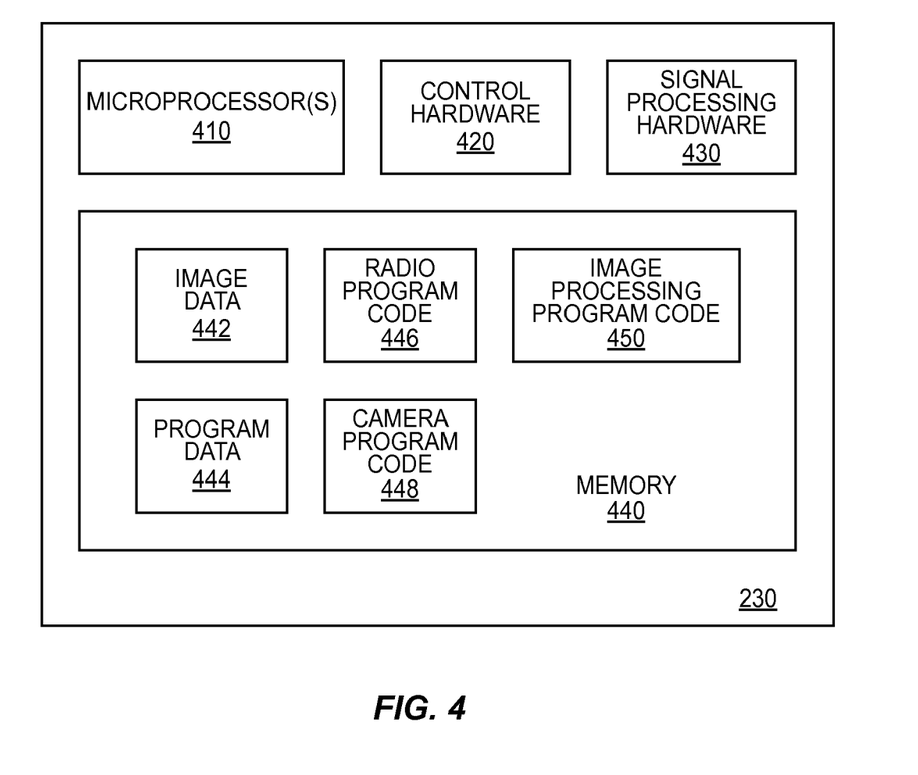
FIG. 4 is a block diagram illustrating physical elements of an exemplary image processing circuit.

Processing of measured reflection profile data produced by radio transceiver 210 and of image data 220 captured by camera 220 is performed in processing circuitry 230. FIG. 3 is a functional block diagram illustrating exemplary functional elements of image processing circuitry 230 according to some embodiments of the invention, while FIG. 4 is a corresponding block diagram illustrating physical elements of processing circuitry 230. Those skilled in the art will appreciate that some embodiments of processing circuitry 230 thus comprise one or more microprocessors 410, control hardware 420, specialized signal processing hardware 430, and memory 440, as shown in FIG. 4. In these embodiments, microprocessor(s) 410 and the signal processing hardware 430 are configured according to program code (e.g., software or firmware), which is stored in memory 440 along with image data 442 captured from camera 220 and general program data 444. The stored program code comprises radio program code 446 for controlling radio transceiver 210, camera program code for controlling camera 220, and image processing program code 450 for processing image data 442 captured with camera 220 and for determining a scale factor for a 3D reconstruction. These program code modules correspond generally to the functional elements of image processing circuitry 230 pictured in FIG. 3, including a camera control function 310, radio control function 320, reflection processing 330, reflection simulation 340, 3D reconstruction 350, and scale estimation processing 360. However, those skilled in the art will appreciate that each of these functional elements, as described in more detail herein, may be implemented with microprocessor(s) 410 or signal processing hardware 430, configured with the corresponding program code, with control hardware 420 or other specialized digital hardware, or with some combination of these. Those skilled in the art will further recognize that processing circuitry 230 may comprise one or several integrated circuits, any of which may be an application-specific integrated circuit (ASIC), and that memory 440 may comprise one or more of various types of memory, including flash memory, random-access memory (RAM), read-only memory (ROM), magnetic storage devices, optical storage devices, and the like.

Figure 5:
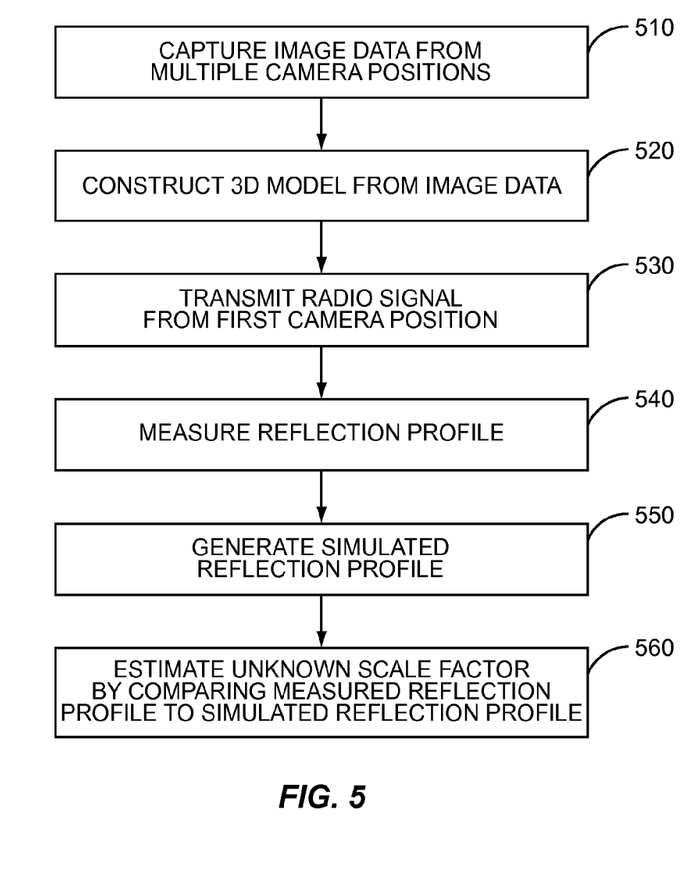
FIG. 5 is a process flow diagram illustrating a general method of processing image data according to some embodiments of the present invention.

A general method for processing image data according to some embodiments of the invention, such as might be carried out using the image processing apparatus of FIG. 2, is illustrated in the process flow diagram of FIG. 5. Although FIG. 5 illustrates a particular sequence of steps, those skilled in the art will appreciate that several of the illustrated steps may be practiced in orders other than those shown, and that some of the illustrated steps may correspond to continuous processes. In any event, the illustrated process "begins", as shown at block 510 with the capturing of image data from multiple camera positions surrounding a subject of interest. At block 520, a 3D model is constructed from the image data, e.g., using known 3D reconstruction techniques. In some embodiments, the 3D reconstruction process may begin as soon as at least two images are available, so that the 3D model is updated as each subsequent image is captured. In others, the 3D reconstruction process may not begin until a pre-determined number of images are available, or until a user indicates that 3D reconstruction should begin.

As shown at block 530, a radio signal is transmitted from a first camera position, the first camera position corresponding to one of the captured images used in the 3D reconstruction. In some embodiments, the radio signal is transmitted simultaneously (or at least closely in time) with the capturing of the corresponding digital image, to ensure that the resulting measured reflection profile accurately corresponds to the camera position for the image. Furthermore, the transmitted signal may be generated in some embodiments by activating the transmitter portion of a communications transceiver (e.g., a cellular transceiver, WLAN transceiver, or Bluetooth® transceiver), although a purpose-built transmitter may be used in other embodiments.

In any case, the transmitting of the radio signal is followed by a measurement of a reflection profile corresponding to reflections of the transmitted signal from the subject of interest, as shown at block 540. As discussed above, the measuring of the reflection profile for the transmitted signal in some embodiments comprises generating a graph of correlations between the transmitted radio signal and a received reflected radio signal at a plurality of time delays.

Figure 7A:
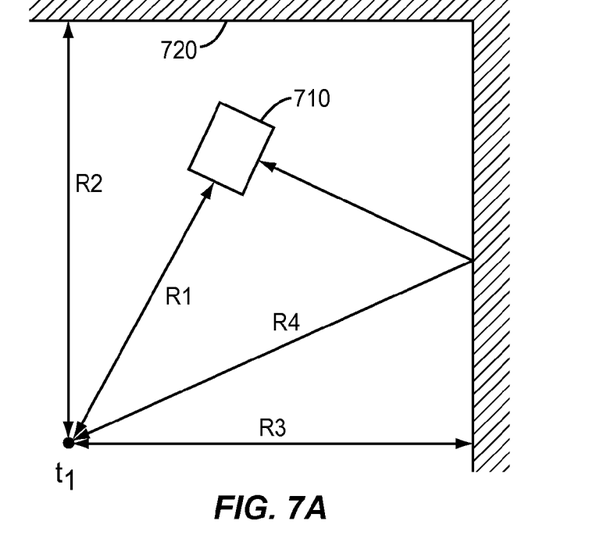
Figure 7B:
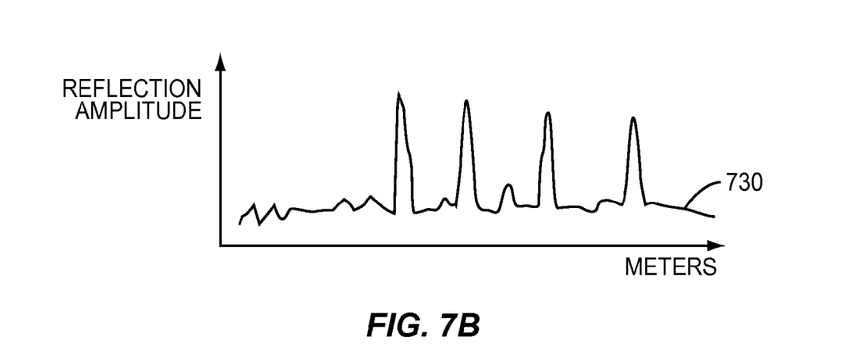
FIGS. 7B and 7C illustrate the corresponding measured reflection profile and simulated reflection profile, respectively.

This reflection profile measurement process may be more readily understood by referring to FIGS. 7A and 7B. FIG. 7A illustrates a plan view of a subject of interest, comprising object 710 and surrounding walls 720, and a camera position T1. Ray paths R1-R4 represent several propagation and reflection paths taken by a radio signal transmitted from camera position T1. Ray R1 travels directly to the object 710 and bounces directly back, while rays R2 and R3 travel to the wall 720 and reflect back to the camera position. Ray R4 illustrates a more complex reflection path, where the transmitted radio signal bounces off the wall 720, bounces off of object 710, back to the wall 720, and then finally back to the camera position T1.

An exemplary output from the reflection profile measuring process is illustrated in FIG. 7B, where reflection amplitude is plotted as a function of distance. Those skilled in the art will appreciate that the distance can be derived directly from the elapsed time between the transmitted signal and the reflected signal components, given that radio waves propagate at the speed of light and that the elapsed time to the receipt of the reflected signal represents twice the propagation time to the object causing the reflection. Several peaks can be observed in the plot of FIG. 7B, these peaks, from left to right, represent the reflections corresponding to rays R1-R4. The remainder of the plotted reflection profile represents noise and/or reflections of lesser importance.

Referring once more to the process flow diagram of FIG. 5, the measurement of the reflection profile corresponding to the first camera position is followed by the generation of a simulated reflection profile, as shown at block 550. Then, as shown at block 560, the unknown scale factor for the 3D model is estimated, by comparing the measured reflection profile to the simulated reflection profile. Further details of the reflection profile measurement, simulated reflection profile generation, and scale factor estimation processes are discussed below.

Figure 9:
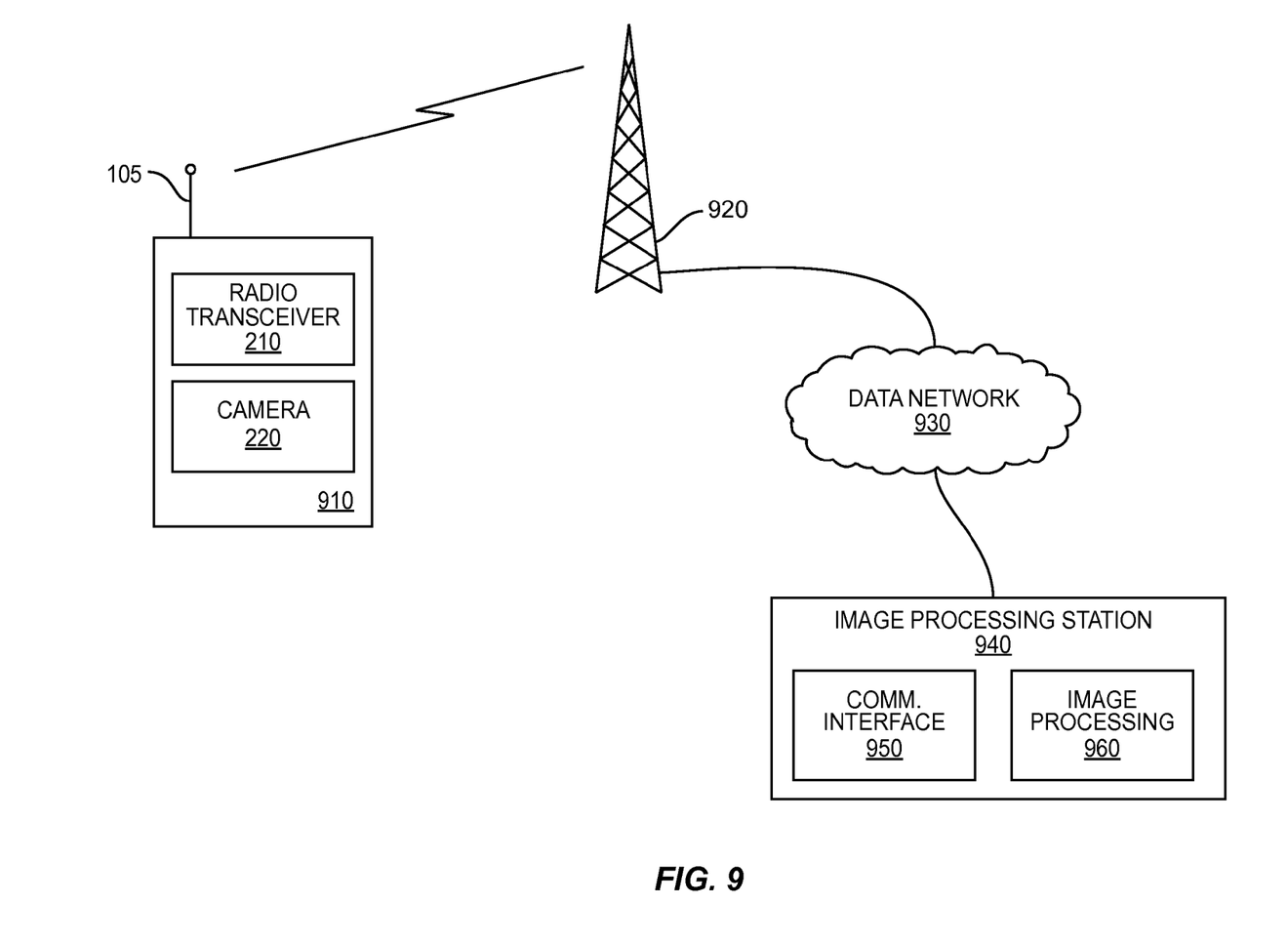
FIG. 9 is a schematic diagram of an exemplary communications network including a wireless-enabled image capture device and an image processing station accessible to the image capture device via a wireless data network.

First, however, it should be noted that while the process illustrated in FIG. 5 may be implemented in a single device, e.g., the image processing apparatus of FIG. 2, other embodiments of the invention may be implemented using a distributed system, in which the image capture is performed remotely from the 3D reconstruction and scale factor estimation processes. This can be seen by referring to FIG. 9, which illustrates an exemplary communications network comprising a image capture apparatus 910, equipped with a radio transceiver 210 and camera 220, a cellular data network represented by cellular base station 920 and data network 930, and an image processing station 940, which in turn comprises a communication interface 950 for communicating with the image capture apparatus 910 and an image processing unit 960. Image processing station 940 may comprise a personal computer, a server, or the like, configured with an appropriate communication interface (e.g. an Ethernet, cable modem, or wireless interface) and configured with appropriate program code to carry out the image processing techniques disclosed herein. In the network of FIG. 9, digital images of a subject of interest are captured by image capture apparatus 910, and sent to the image processing station 940 for subsequent processing. Furthermore, at least one measured reflection profile is obtained by image capture apparatus 910, and corresponding reflection profile data forwarded to image process station 940 for processing.

Figure 6:
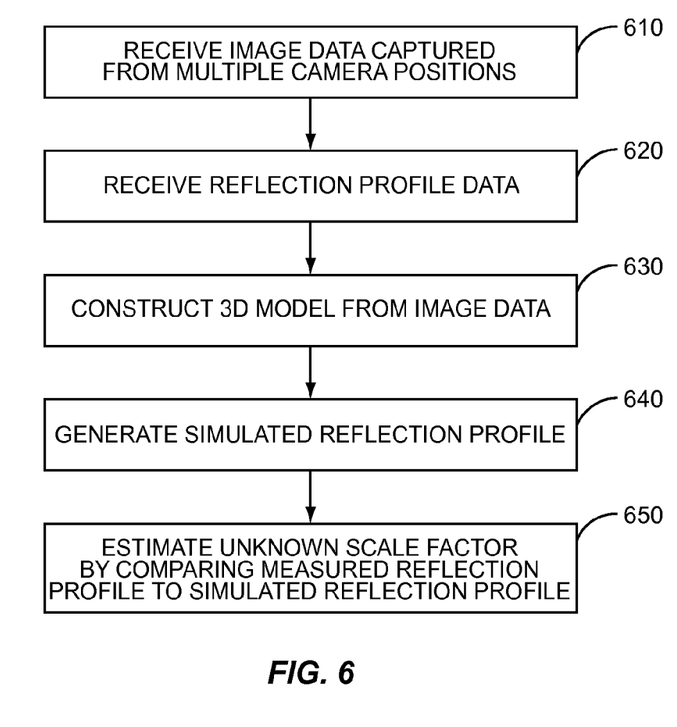
FIG. 6 is a process flow diagram illustrating a general method of processing image data according to other embodiments of the present invention

Accordingly, FIG. 6 provides an alternative to the method illustrated in FIG. 5. The process illustrated in FIG. 6 begins with the receiving, from the remote image capture apparatus, of image data captured from multiple camera positions, as shown at block 610. Reflection profile data, corresponding to a measured reflection profile for at least one of the camera positions, is also received, as shown at block 620.

At block 630, a 3D model is constructed from the received image data. Given the 3D model, a simulated reflection profile can be generated, as discussed generally above, as shown at block 640. Then, the unknown scale factor for the 3D model can be estimated by comparing the reflection profile data to the simulated reflection profile, as shown at block 650.

Figure 8:
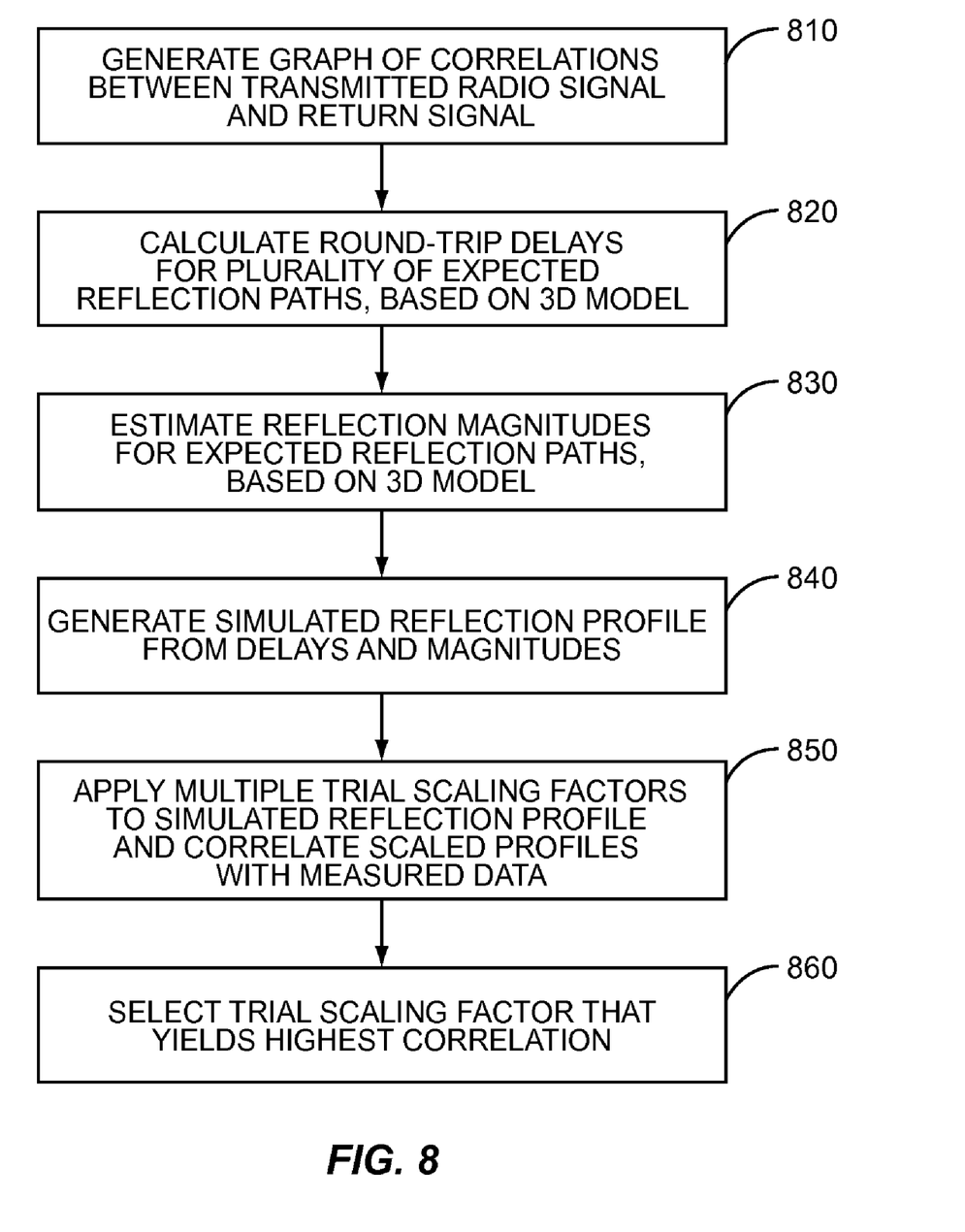
FIG. 8 is a process flow diagram illustrating details of an exemplary technique for measuring a reflection profile, generating a simulated reflecting profile, and estimating an unknown scale factor for a 3D model.

Further details of the reflection profile measurement, simulated reflection profile generation, and scale factor estimation processes are illustrated in the process flow diagram of FIG. 8. Those skilled in the art will appreciate that these details are applicable to either of the more general process flows illustrated in FIGS. 5 and 6 (and thus may be implemented in either the image processing apparatus of FIG. 2, the image processing station of FIG. 9, or some combination thereof).

First, as shown at block 810, measuring the reflection profile corresponding to the radio signal transmitted from a given camera position may comprise generating a graph of correlations between the transmitted radio signal and the return signal. As noted above, the transmitted radio signal may comprise a modulated waveform. The return signal can be correlated with the transmitted signal at each of a plurality of time delays to yield the correlation graph. In some embodiments, this correlation process may be preceded by the cancellation of the transmitted signal from the received signal, e.g., to mitigate problems caused by the transmitted signal leaking directly into the receiver. In other embodiments, such as where the transmitted signal comprises a short, gated pulse, this cancellation may be unnecessary.

Blocks 820, 830, and 840 illustrate the generation of the simulated reflection profile from the 3D reconstruction model, which was in turn generated from a set of images including the image corresponding to the first camera position. As discussed in the background section above, if the camera intrinsic parameters are known or can be estimated, then the camera's position relative to the 3D model is "known" except for an unknown scale. Thus, a simulated reflection profile can be generated by simply tracing several rays between the camera's position, given an arbitrary reference scaling metric, and various objects in the 3D model, and determining which ray paths are likely to cause reflections back to the camera position. Round-trip delays corresponding to those expected reflection paths can then be calculated, given the reference scaling metric, as shown at block 820. In some embodiments, a simulated graph of correlations may be generated solely from the calculated round-trip delays. In other embodiments, however, reflection magnitudes corresponding to one or more of the expected reflections paths may be estimated, as shown at block 830, based on the 3D model of the subject of interest and the reference scaling metric. Thus, as shown at block 840, the simulated reflection profile may be based on both the estimated round-trip delays and estimated reflection magnitudes.

Figure 7C:
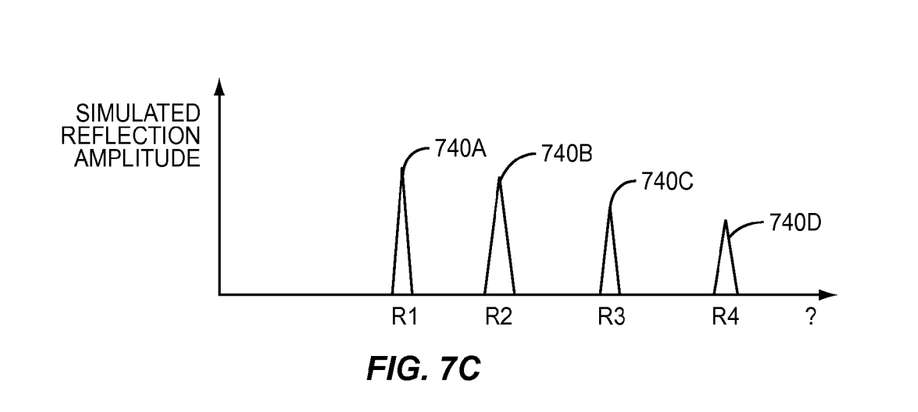

FIG. 7C shows a simulated reflection profile corresponding to the scenario illustrated in FIG. 7A. Here, the peaks labeled R1-R4 correspond directly to the rays R1-R4 pictured in FIG. 7A, and are spaced along the x-axis according to estimated round-trip delay times given an arbitrary reference scaling metric. (At this point, the actual scale of the 3D model is unknown.) Further, the amplitudes of the peaks illustrated in FIG. 7C vary, based on an estimate of the reflection magnitudes for each ray. This estimate may be based solely on the propagation distance, in some embodiments, or may be based further on some estimate of the reflectivity of the various objects in the 3D model, in others.

Generally speaking, then, the graph of the measured reflection profile (e.g., the graph of FIG. 7B) may be compared to the simulated graph (e.g., FIG. 7C), to determine the proper scaling factor. Effectively, the simulated reflection profile is "stretched" or "compressed" in the horizontal dimension until it best corresponds to the measured reflection profile. When correspondence is established between the two graphs we have metric measurements for the 3D reconstruction. Correspondence can be determined either from the graphs in the time domain, e.g., by calculating the scalar product of the vectors corresponding to the graphs for different scales of the simulated graph, or in the frequency domain using the scaling rule for the Fourier transform, $$\mathbb{F}_{(f(\alpha-t))} = 1/1\alpha1\ F(\omega/\alpha),$$

where $\mathbb{F}(f(t)) = F(\omega)$.

Referring back to FIG. 8, some embodiments of the present invention may estimate the unknown scaling factor by first scaling the simulated reflection profile in the horizontal dimension with each of a plurality of trial scaling factors, correlating the scaled simulated reflection profiles to the measured reflection profile, as shown at block 850. The scale factor is then readily determined by simply identifying and selecting which of these trial scaling factors yields the highest correlation, as shown at block 860.

Further variations of the inventive methods and apparatus discussed above are possible. For instance, a separate measured reflection profile may be obtained for one or more additional camera positions, in some embodiments. These additional measured reflection profiles are compared to corresponding additional simulated reflection profiles, created from the 3D reconstruction of the scene and the corresponding camera positions. An additional scale estimate can be estimated for each of these additional camera positions. Because the actual scale parameter is the same for all camera positions, the unknown scale factor can be estimated by computing an average scale estimate from the first estimate of the unknown scale and the additional scale estimates. Of course, these scale estimates need not be weighted equally; a scale estimate deemed to have more reliability may be weighted more heavily than other scale estimates in this averaging computation.

Once the scale factor for the 3D reconstruction is known, it becomes possible to make measurements of individual objects in the 3D reconstruction, to add external objects to the reconstruction, to combine different 3D reconstructions into a single scene, and generate stereo images with a particular distance between the camera centers without manual interaction. Those skilled in the art will recognize further advantages flowing from the application of the techniques described herein.

With the above variations and examples in mind, those skilled in the art will appreciate that the preceding descriptions of various embodiments of methods and apparatus for processing image data are given for purposes of illustration and example, and that further variations are possible and within the scope of the claimed invention. As suggested above, one or more of the specific processes discussed above, including the process flows illustrated in FIGS. 5, 6, and 8, may be carried out in a portable image processing apparatus, which may in turn be part of a wireless user terminal, such as a cellular phone, wireless-enabled computer or portable digital assistant, or the like. Alternatively, all or part of the various techniques described herein may be carried out in a network-connected image processing station, such as the image processing station of FIG. 9, which may comprise a network-connected personal computer, server, or the like, configured with appropriate software to carry out the specific image processing techniques described herein. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of processing image data, the method comprising:
    capturing image data of a subject of interest from each of a plurality of camera positions and constructing a three-dimensional model of the subject of interest based on the captured image data, the three-dimensional model having an unknown scale;
    transmitting a radio signal from a first one of the camera positions and measuring a reflection profile for the transmitted radio signal;
    generating a simulated reflection profile corresponding to the first one of the camera positions; and
    calculating a first estimate of the unknown scale for the three-dimensional model by comparing the measured reflection profile to the simulated reflection profile.

2. The method of claim 1, further comprising transmitting the radio signal from the first one of the camera positions simultaneously with capturing image data from the first one of the camera positions.

3. The method of claim 1, wherein transmitting the radio signal comprises activating a communications transceiver.

4. The method of claim 1, wherein measuring a reflection profile for the transmitted radio signal comprises generating a graph of correlations between the transmitted radio signal and a received reflected radio signal at a plurality of time delays.

5. The method of claim 4, wherein generating a simulated reflection profile comprises calculating round-trip delays corresponding to a plurality of expected reflection paths, based on the three-dimensional model of the subject of interest and a reference scaling metric, and generating a simulated graph of correlations based on the calculated round-trip delays.

6. The method of claim 5, wherein generating a simulated reflection profile further comprises estimating reflection magnitudes corresponding to one or more of the expected reflection paths, based on the three-dimensional model of the subject of interest and the reference scaling metric, and wherein the simulated graph of correlations is based further on the estimated reflection magnitudes.

7. The method of claim 1, wherein calculating a first estimate of the unknown scale for the three-dimensional model comprises determining which of a plurality of trial scaling factors, when applied to the simulated reflection profile to obtain a scaled simulated reflection profile, yields the highest correlation between the scaled simulated reflection profile and the measured reflection profile.

8. The method of claim 1, further comprising:
    measuring one or more additional measured reflection profiles corresponding to one or more additional camera positions;
    generating one or more additional simulated reflection profiles corresponding to the one or more additional camera positions;
    calculating an additional scale estimate for each of the one or more additional camera positions by comparing the additional measured reflection profiles to the corresponding additional simulated reflection profiles; and
    computing an average scale estimate from the first estimate of the unknown scale and the additional scale estimates.

9. An image processing apparatus, comprising a digital camera device, a radio transceiver, and processing circuitry configured to:
    construct a three-dimensional model of a subject of interest based on image data of the subject of interest captured from each of a plurality of camera positions, the three-dimensional model having an unknown scale;
    measure a reflection profile for a radio signal transmitted by the radio transceiver from a first one of the camera positions;
    generate a simulated reflection profile corresponding to the first one of the camera positions; and
    calculate a first estimate of the unknown scale for the three-dimensional model by comparing the measured reflection profile to the simulated reflection profile.

10. The image processing apparatus of claim 9, wherein the processing circuit is configured to control the radio transceiver to transmit the radio signal simultaneously with the capturing of the image data for the first one of the camera positions.

11. The image processing apparatus of claim 9, wherein the radio transceiver comprises at least one of a cellular communications transceiver, a wireless local-area network transceiver, and a short-range wireless transceiver.

12. The image processing apparatus of claim 9, wherein the processing circuitry is configured to measure the reflection profile for the transmitted radio signal by generating a graph of correlations between the transmitted radio signal and a received reflected radio signal at a plurality of time delays.

13. The image processing apparatus of claim 12, wherein the processing circuitry is configured to generate the simulated reflection profile by calculating round-trip delays corresponding to a plurality of expected reflection paths, based on the three-dimensional model of the subject of interest and a reference scaling metric, and generating a simulated graph of correlations based on the calculated round-trip delays.

14. The image processing apparatus of claim 13, wherein the processing circuitry is configured further to generate the simulated reflection profile by estimating reflection magnitudes corresponding to one or more of the expected reflection paths, based on the three-dimensional model of the subject of interest and the reference scaling metric, and generating the simulated graph of correlations based further on the estimated reflection magnitudes.

15. The image processing apparatus of claim 9, wherein the processing circuitry is configured to calculate the first estimate of the unknown scale for the three-dimensional model by determining which of a plurality of trial scaling factors, when applied to the simulated reflection profile to obtain a scaled simulated reflection profile, yields the highest correlation between the scaled simulated reflection profile and the measured reflection profile.

16. The image processing apparatus of claim 9, wherein the processing circuitry is further configured to:
measure one or more additional measured reflection profiles corresponding to one or more additional camera positions;
generate one or more additional simulated reflection profiles corresponding to the one or more additional camera positions;
calculate an additional scale estimate for each of the one or more additional camera positions by comparing the additional measured reflection profiles to the corresponding additional simulated reflection profiles; and
compute an average scale estimate from the first estimate of the unknown scale and the additional scale estimates.

17. A method of processing image data, the method comprising:
receiving image data of a subject of interest captured from each of a plurality of camera positions and constructing a three-dimensional model of the subject of interest based on the captured image data, the three-dimensional model having an unknown scale;
receiving reflection profile data corresponding to a reflection profile measured by transmitting a radio signal from a first one of the camera positions and measuring a reflected return signal;
generating a simulated reflection profile corresponding to the first one of the camera positions; and
calculating a first estimate of the unknown scale for the three-dimensional model by comparing the reflection profile data to the simulated reflection profile.

18. The method of claim 17, wherein the reflection profile data comprises a graph of correlations between the transmitted radio signal and the reflection return radio signal at a plurality of time delays.

19. The method of claim 18, wherein generating a simulated reflection profile comprises calculating round-trip delays corresponding to a plurality of expected reflection paths, based on the three-dimensional model of the subject of interest and a reference scaling metric, and generating a simulated graph of correlations based on the calculated round-trip delays.

20. The method of claim 19, wherein generating a simulated reflection profile further comprises estimating reflection magnitudes corresponding to one or more of the expected reflection paths, based on the three-dimensional model of the subject of interest and the reference scaling metric, and wherein the simulated graph of correlations is based further on the estimated reflection magnitudes.

21. The method of claim 17, wherein calculating a first estimate of the unknown scale for the three-dimensional model comprises determining which of a plurality of trial scaling factors, when applied to the simulated reflection profile to obtain a scaled simulated reflection profile, yields the highest correlation between the scaled simulated reflection profile and the reflection profile data.

22. The method of claim 17, further comprising:
receiving additional reflection profile data for one or more additional measured reflection profiles corresponding to one or more additional camera positions;
generating one or more additional simulated reflection profiles corresponding to the one or more additional camera positions;
calculating an additional scale estimate for each of the one or more additional camera positions by comparing the additional measured reflection profiles to the corresponding additional simulated reflection profiles; and
computing an average scale estimate from the first estimate of the unknown scale and the additional scale estimates.

23. An image processing apparatus, comprising a communications interface configured for communicating with an image capture apparatus and a processing subsystem configured to:
receive, via the communications interface, image data of a subject of interest captured by the image capture apparatus from each of a plurality of camera positions;
construct a three-dimensional model of the subject of interest based on the captured image data, the three-dimensional model having an unknown scale;
receive, via the communications interface, reflection profile data corresponding to a reflection profile measured by the image capture apparatus by transmitting a radio signal from a first one of the camera positions and measuring a reflected return signal;
generate a simulated reflection profile corresponding to the first one of the camera positions; and
calculate a first estimate of the unknown scale for the three-dimensional model by comparing the reflection profile data to the simulated reflection profile.

24. The image processing apparatus of claim 23, wherein the processing subsystem is configured to generate the simulated reflection profile by calculating round-trip delays corresponding to a plurality of expected reflection paths, based on the three-dimensional model of the subject of interest and a reference scaling metric, and generating a simulated graph of correlations based on the calculated round-trip delays.

25. The image processing apparatus of claim 23, wherein the processing subsystem is further configured to generate the simulated reflection profile by estimating reflection magnitudes corresponding to one or more of the expected reflection paths, based on the three-dimensional model of the subject of interest and the reference scaling metric, and generating the simulated graph of correlations based further on the estimated reflection magnitudes.

26. The image processing apparatus of claim 23, wherein the processing subsystem is configured to calculate the first estimate of the unknown scale for the three-dimensional model by determining which of a plurality of trial scaling factors, when applied to the simulated reflection profile to obtain a scaled simulated reflection profile, yields the highest correlation between the scaled simulated reflection profile and the reflection profile data.

27. The image processing apparatus of claim 23, wherein the processing subsystem is further configured to:

receive, via the communications interface, additional reflection profile data for one or more additional measured reflection profiles corresponding to one or more additional camera positions;

generate one or more additional simulated reflection profiles corresponding to the one or more additional camera positions;

calculate an additional scale estimate for each of the one or more additional camera positions by comparing the additional measured reflection profiles to the corresponding additional simulated reflection profiles; and compute an average scale estimate from the first estimate of the unknown scale and the additional scale estimates.

* * * * *